Figure 1A:
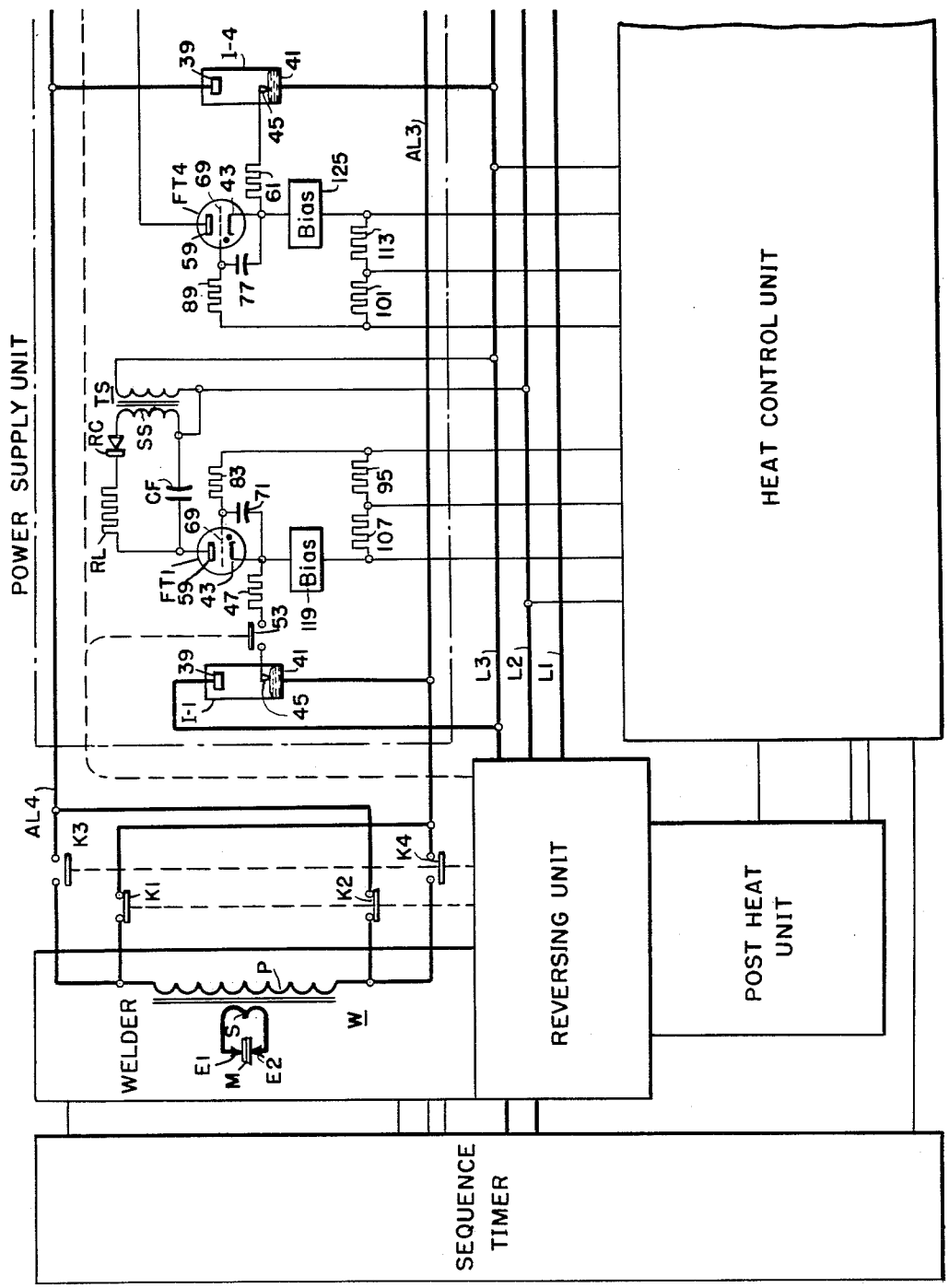

Dec. 20, 1955  E. C. HARTWIG ET AL  2,728,031
IMPULSE WELDING CONTROL
Filed July 21, 1953  4 Sheets-Sheet 4

WITNESSES:
E.G. McCloskey
Leon J. Vaza

INVENTORS
Hubert W. Van Ness
and Edward C. Hartwig.
BY
Hyman Diamond
ATTORNEY

_United States Patent Office_

2,728,031
Patented Dec. 20, 1955

2,728,031
IMPULSE WELDING CONTROL

Edward C. Hartwig, Walnut Creek, Calif., and Hubert W. Van Ness, East Aurora, N. Y., assignors to Westinghouse Electric Corporation, East Pittsburgh, Pa., a corporation of Pennsylvania Application July 21, 1953, Serial No. 369,356

7 Claims. (Cl. 315—181)

Our invention relates to electric discharge apparatus and has particular relation to apparatus for converting power from a polyphase source to single phase at a lower frequency than that of the source.

Apparatus which typifies the prior art of which we are aware is disclosed in application Serial No. 272,818, filed February 21, 1952 to Clarence B. Stadum, Hubert W. Van Ness and Edward C. Hartwig, and assigned to Westinghouse Electric Corporation, which will be called Stadum application hereinafter. In the Stadum application, a converter system is disclosed which is adapted to supply a single-phase load in effect having a pair of terminals directly from the buses of a polyphase source. The load is supplied through electric discharge devices of the ignitron type, a first plurality of such devices being interposed between the buses and one terminal of the load, and a second plurality of such devices being interposed between the buses and the other terminal of the load. The cathodes of the first plurality of devices are connected together to the first terminal, and the anodes are connected each to one of the buses; the anodes of the second plurality of devices are connected together to the other load terminal, and the cathodes are connected each to one of the buses. Current may thus be conducted at any instant from the buses through the load and through two of the discharge devices in series.

With each of the discharge devices a firing valve is associated, and a heat control unit is provided for rendering conductive the firing valve during predetermined intervals during which the apparatus is to operate. At the beginning of each of these intervals, two of the firing valves are rendered conductive simultaneously, one valve, the valve which fires, to the one of the plurality of discharge devices which is initially to conduct the load current and the other valve to one which fires the other plurality of discharge devices which is to conduct the load current initially. Thereafter, the firing valves are rendered conductive in succession during the remaining portion of the interval.

In using apparatus of this type, we have found that it at times mysteriously fails to operate at sporadic intervals. Our investigation of this mysterious failure has indicated that it occurs when the apparatus is supplied from buses operating at a relatively low voltage, for example, 230 volts. At higher voltages, 440 volts, for example, the failure does not occur.

It is accordingly an object of our invention to suppress the above-described mysterious sporadic failure of apparatus such as is disclosed in Stadum application.

Another object of our invention is to provide a polyphase to single-phase converter, the operation of which shall be entirely reliable even at relatively low supply potentials.

An incidental object of our invention is to provide a novel firing circuit for electric discharge devices of the ignitron type.

Our invention arises from the discovery that the failure of the apparatus to operate is caused by the character of the starting at the beginning of a conductive interval. At this time, two of the firing valves are rendered conductive simultaneously, and to accomplish this object, the potential from the source is connected across both of the valves in series through the associated igniters. When the potential is relatively low, inadequate power is available for effective firing.

In accordance with the specific aspects of our invention, we provide converting apparatus in which the two discharge devices which are fired at the beginnings of conductive intervals are provided with a so-called independent firing circuit. Such a circuit need only be provided for the initial devices because once the initial devices are fired, the others conduct in succession and the full potential is available firing the latter.

Figure 1B:
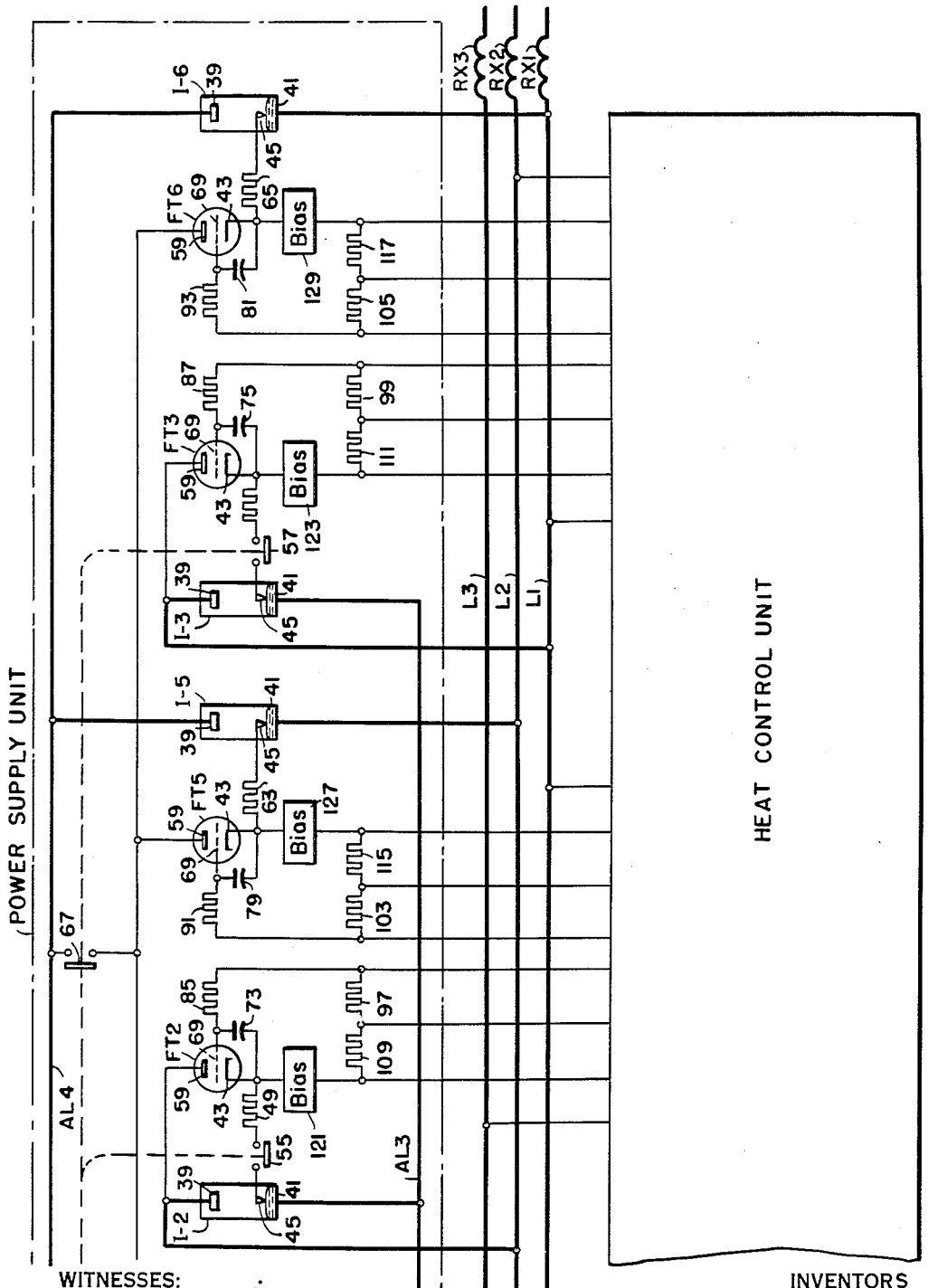
Figure 2:
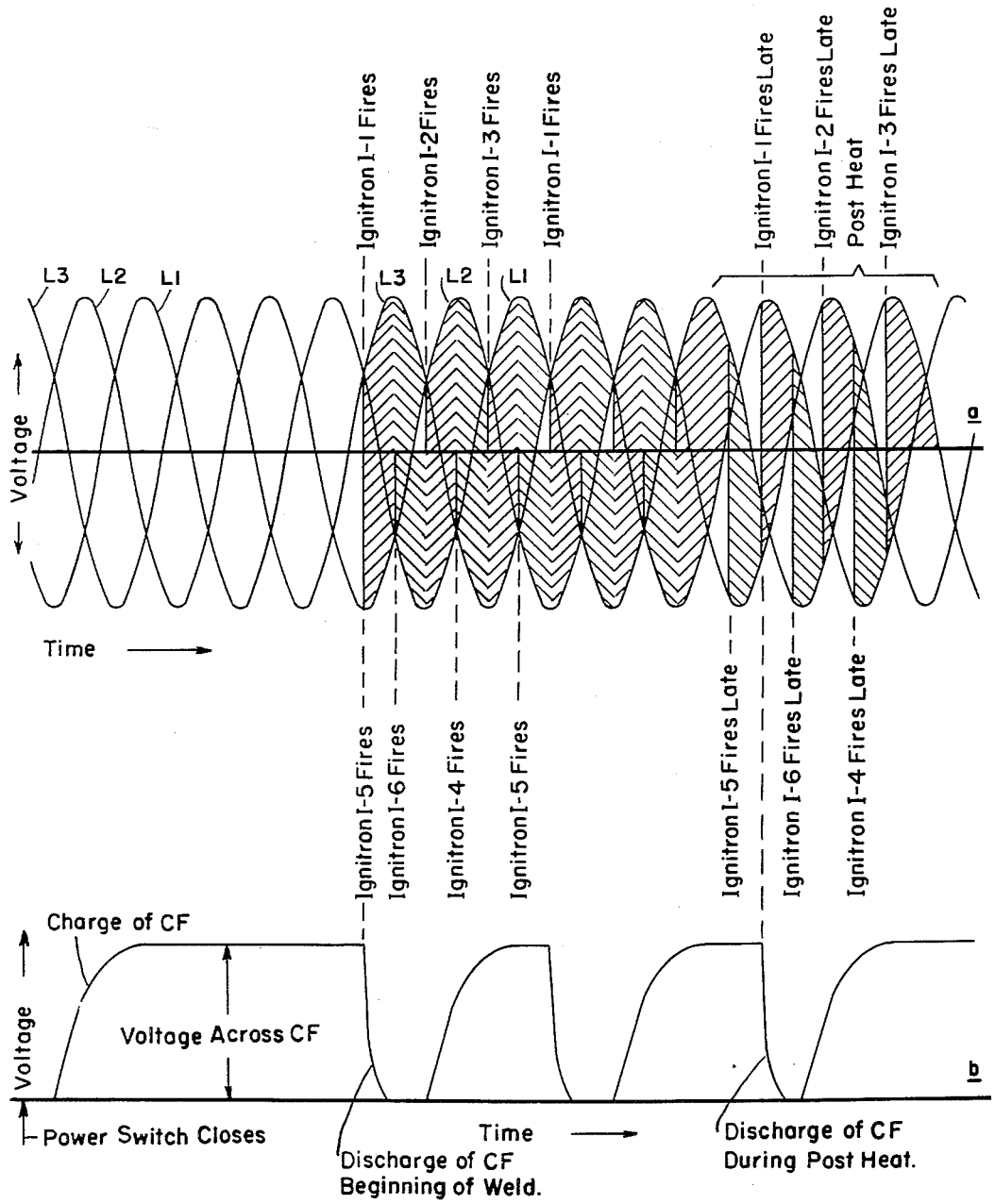
Figure 3:
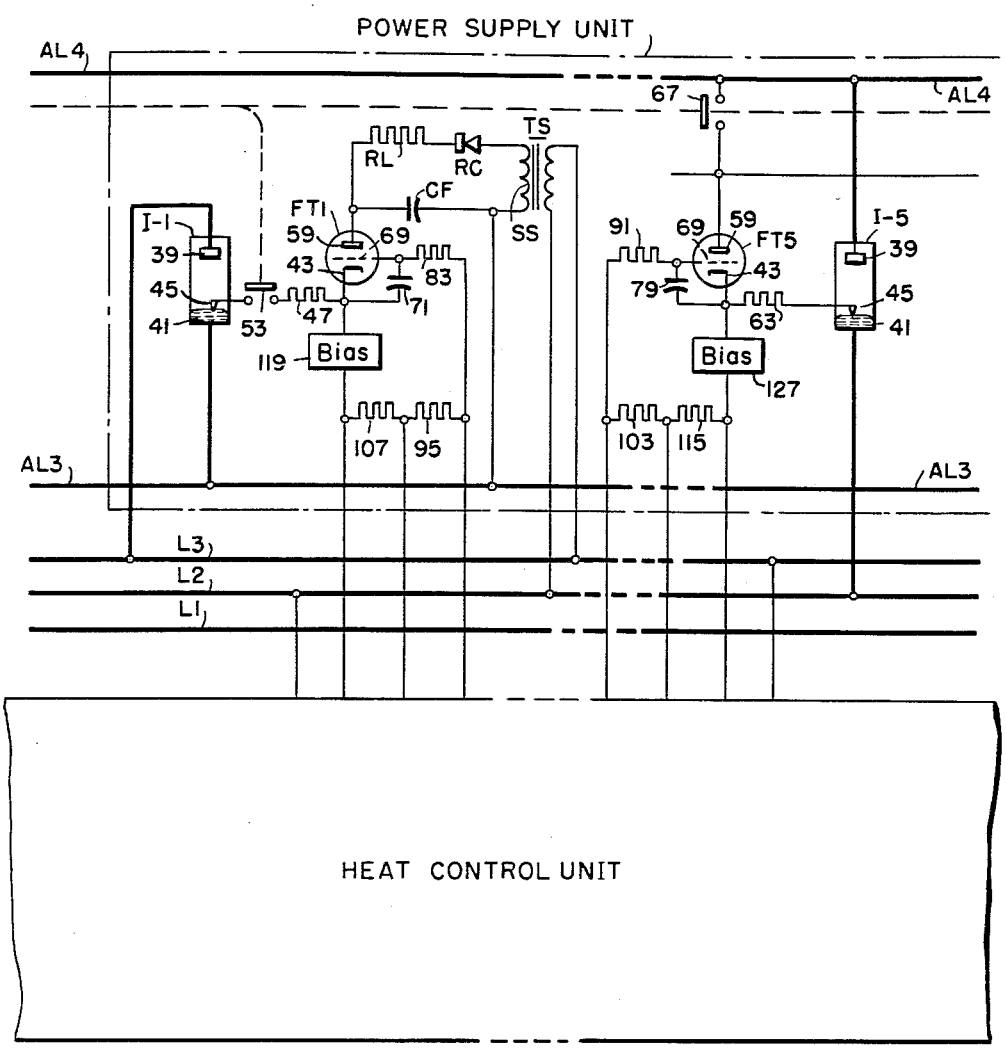

The novel features that we consider characteristic of our invention are set forth generally above. The invention itself, however, both as to its organization and its method of operation, together with additional objects and advantages thereof, will be understood from the following description of specific embodiments when read in connection with the accompanying drawings, in which:

Figures 1A and 1B together constitute a circuit diagram of apparatus in accordance with our invention;

Fig. 2 is a graph illustrating the operation of apparatus in accordance with our invention; and Fig. 3 is a diagram of a portion of a circuit showing the essential features of a modification of our invention.

Description—Figs. 1A and 1B

The apparatus shown in Figs. 1A and 1B is on the whole similar to apparatus shown in the Stadum application. It includes a welder, a reversing unit, a post-heat unit, a heat control unit, a power supply unit and a sequence timer. Several modifications of these units are disclosed in detail in the Stadum application. Our invention concerns itself primarily with a power supply unit, and for this reason, it alone of the various components is shown in detail in Figs. 1A and 1B. To the extent practicable, the labelling of the Stadum application is adopted in labelling the components of this application.

Our apparatus includes a plurality of power supply conductors L1, L2, L3, which may be connected to a polyphase supply through reactors RX1, RX2, RX3. These reactors are preferably of the non-linear readily saturable type. The unit also includes a pair of load conductors AL3, AL4, each of which may be connected to either of the terminals of the primary P of a welding transformer W through contacts K1 and K2 or K3 and K4. The latter contacts are controlled from the reversing unit as described in the Stadum application.

A plurality of ignitrons I–1, I–2, I–3 are connected between the supply conductors L1, L2, L3 and the load conductor AL3. Each of these ignitrons has an anode 39, a cathode 41 and an igniter 45. The cathodes 41 are connected together to the conductor AL3. The anodes 39 are connected each to a different supply conductor L3, L2 and L1, respectively. Another plurality of ignitrons I–4, I–5 and I–6 are connected between the load conductor AL4 and the buses L1, L2, L3. The anodes 39 of these ignitrons are connected together to the conductor AL4. The cathodes are connected each to a different supply conductor L3, L2 and L1, respectively.

The primary P is thus connected to the supply conductors L1, L2, L3 through the ignitrons and through the contacts K1 through K4 in such a manner that at any instant it may be supplied through an ignitron I–1, I–2, or I–3, and another ignitron I–4, I–5 or I–6. The ignitrons I–1 through I–6 are so controlled from the heat control unit that they are rendered conductive during predetermined intermittent intervals in a predetermined succession, thus supplying current pulses of low frequency to the load conductors AL3 and AL4.

For controlling the conductivity of the ignitrons, firing thyratrons or valves FT1 through FT6, respectively, are associated with each of the ignitrons I-1 through I-6. Each firing thyratron FT1 through FT6 has an anode 59, a cathode 43 and a control electrode 69. The control electrode 69 of each firing thyratron FT1 through FT6 is connected to its associated cathode 43 through grid resistors 83, 85, 87, 89, 91 and 93, a pair of additional resistors 95 and 107, 97 and 109, 99 and 111, 101 and 113, 103 and 115, and 105 and 117, and a blocking bias 119, 121, 123, 125, 127 and 129.

The bias 119, 121, 123, 125, 127 and 129 is of such magnitude as to maintain the associated firing thyratrons FT1 through FT6 non-conductive. As is explained in the Stadum application, potential to counteract the blocking bias 119, 121, 123, 125, 127, 129 is impressed from the heat control unit in sequence across the resistors 95 through 117 in the control circuits of the various firing thyratrons during any interval during which the ignitrons I-1 through I-6 are to conduct. At the beginning of any conductive interval, the counteracting potential is impressed simultaneously on thyratrons FT1 and FT5 to render ignitrons I-1 and I-5 simultaneously conductive. Thereafter, the firing potential is impressed on firing thyratrons FT6, FT2, FT4, FT3 and FT5 in succession to fire each of the associated ignitrons I-6, I-2, I-4, I-3 and I-5 in turn so long as they are to be fired during the interval.

The firing thyratrons FT1 and FT5 associated with the ignitrons which are fired at the beginnings of the intervals, are supplied with firing potential from a firing capacitor CF. This capacitor is connected to be charged from the supply conductors L2 and L3 through a voltage step-up transformer TS, the secondary of which is connected across the capacitor CF through a rectifier RC and a current limiting resistor RL. The firing capacitor CF is connected in a circuit extending from supply conductor L2 through the capacitor CF, the anode 59 and the cathode 43 of firing thyratron FT1, current limiting resistor 47, contact 53 of the weld-no-weld relay, the igniter 45 of ignitron I-1, load conductor AL3, primary P, load conductor AL4, contact 67, the anode 59 and the cathode 43 of firing thyratron FT5, current limiting resistor 63, igniter 45, and cathode 41 of ignitron I-5 to bus L2. Thus, when firing capacitor CF is charged, it may be discharged through the firing thyratrons FT1 and FT5 and the igniters of the associated ignitrons I-1 and I-5.

In accordance with my invention, the potential to which the capacitor CF is charged is sufficiently high to provide adequate firing current for the igniters 45 with which it is connected in series. The polarity of the transformer TS is such that the capacitor CF is charged during the half periods of the supply during which the bus L3 is negative relative to the bus L2 so that the capacitor in its stand-by condition is adapted to provide firing potential for the ignitrons I-1 and I-5 when they are to be fired simultaneously.

The anodes 59 of the firing thyratrons FT2 and FT3 are connected directly to the anodes of the associated ignitrons I-2 and I-3. The cathodes of thyratrons FT2 and FT3 are connected through current limiting resistors 49 and 51, and through contacts 55 and 47, respectively, of a weld-no-weld relay to the igniters 45 of the ignitrons I-2 and I-3. The anodes 59 of the thyratrons FT4, FT5 and FT6 are connected through contact 67 of the weld-no-weld relay to load conductor AT4 and thence to the anodes 39 of ignitrons I-4, I-5 and I-6. The cathodes 43 of firing thyratrons FT4, FT5, and FT6 are connected through current limiting resistors 61, 63 and 65 to the igniters 45 of the ignitrons I-4, I-5 and I-6.

*Stand-by—Figs. 1A and 1B*

During the stand-by condition of the apparatus, the power switches (not shown) are closed, and power is supplied to the supply conductors L1, L2 and L3. The reversing unit is in a condition such that contacts K1 and K2 are closed and contacts K3 and K4 are open, or the latter are open and the former are closed. The heaters for the cathodes 43 of the firing thyratrons FT1 through FT6 and the heaters for the other discharge devices in the apparatus are energized so that the thyratrons FT1 through FT6 and the other discharge devices are ready to conduct. The weld-no-weld relay is energized and the contacts 53, 55, 57 and 67 are closed. Supply conductors L2 and L3 supply potential so that the capacitor CF is charged through the rectifier RC with its plate connected to the anode 59 of thyratron FT1 positive and the other plate negative.

*Operation—Figs. 1A and 1B*

In discussing the operation, it will be assumed that contacts K1 and K2 are closed and K3 and K4 open.

To initiate a welding operation, a start switch (not shown), such as a foot switch, in the sequence timer, is closed. The sequence timer then operates as described in the Stadum application. The electrodes E1 and E2 are engaged with the work M during a squeeze interval, and after this squeeze interval at the beginning of the weld interval, the heat control unit is actuated to supply pulses to render firing thyratrons FT1 through FT6 conductive. Initially, the pulses are supplied to the thyratrons FT1 and FT5, and the latter are rendered conductive simultaneously. Current is then supplied from the firing capacitor CF through the anode 59 and cathode 43 of thyratron FT1, the igniter 45 of ignitron I-1, the primary P, the anode 59 and cathode 43 of firing thyratron FT5, the igniter 45 and cathode 41 of ignitron I-5 to the capacitor CF. The potentials which are supplied by the heat control unit are so related to the potentials of the supply conductors L1, L2, L3 that bus L3 is most positive relative to bus L2 when these pulses are supplied to render firing thyratrons FT1 and FT5 conductive and thus ignitrons I-1 and I-5 can conduct when the pulses to render thyratrons FT1 and FT5 conductive are supplied. Because the capacitor CF is charged to a high potential, the current flow through the igniters 45 is adequate, and both ignitrons I-1 and I-5 are positively fired. Under such circumstances, current flows from bus L3 through ignitron I-1, contact K1 downward through primary P, contact K2, conductor AL4, ignitron I-5 to bus L2.

Ignitrons I-6, I-2, I-4, I-3 and I-5 are then fired in succession, as described in the Stadum application. Thus, approximately ⅙ of a period of the supply after ignitrons I-1 and I-5 are rendered conductive, a potential is supplied to fire ignitron I-6. At this time, conductor L1 is becoming more negative than conductor L2. Initially, ignitrons I-1, I-5 and I-6 conduct together, but in a short time interval, ignitron I-5 becomes non-conductive and current flow continues from bus L3, through ignitron I-1, contact K1, downward through primary P, contact K2, conductor AL4, ignitron I-6 to supply conductor L1. One-sixth of a period later, potential is supplied to firing thyratron FT2 to render it conductive and to fire ignitron I-2. Ignitron I-1 is immediately thereafter rendered non-conductive. At this time, supply conductor L2 is most positive relative to supply conductor L1, and current flows from conductor L2 through ignitron I-2 downward through primary P, conductor AL4, ignitron I-6 to bus L1. One-sixth of a period later, the ignitron I-4 is rendered conductive, and current flows downward through the primary P through ignitrons I-2 and I-4. One-sixth of a period thereafter, ignitron I-3 is rendered conductive, and current continues to flow downward through primary P, ignitron I-3 and ignitron I-4.

One-sixth of a period later, potential to render firing thyratron FT5 conductive is supplied. This is one of the thyratrons of the pair initially fired simultaneously but this time it is fired independently of the other thyratron FT1 of the pair because ignitron I-3 is conductive. The anode 59 of thyratron FT5 is connected through contact 67, conductor AL4, primary P, conductor AL3, the cathode 41 and anode 39 of conductor ignitron I-3 to supply conductor L1; the cathode 43 of this thyratron FT5 is connected through current-limiting resistor 63, igniter 45 and cathode 41 of ignitron I-5 to supply conductor L2, which is most negative with respect to conductor L1. Since the drop across the conductive ignitron I-3 is relatively small, substantially all of the potential between supply conductors L2 and L1 is impressed in the anode and cathode circuit of thyratron FT5, and when the latter becomes conductive, it conducts adequate current through the igniter 45 to fire ignitron I-5. Current now flows downward through the primary P, through ignitrons I-3 and I-5. Ignitrons I-1 through I-6 have now passed through one complete cycle of conduction. If the heat control unit is set for an interval larger than that afforded by one cycle of conduction of the ignitrons I-1 through I-6, the cycle is now repeated, but the ignitrons are now rendered conductive in succession one at a time.

One-sixth of a period after ignitron I-5 was last fired, potential is supplied to firing thyratron FT1 to render it conductive. By this time, firing capacitor CF has again charged, and it discharges through firing thyratron FT1, igniter 45 and cathode 41 of ignitron I-1, the primary P, and ignitron I-5. Ignitron I-1 is then rendered conductive, and current now flows as in the beginning of the conductive interval through ignitrons I-1 and I-5. The other ignitrons I-6, I-2, I-4, I-3 and I-5 may now be rendered conductive in succession to repeat the above-described sequence. Thereafter, there may be further cycles of conduction, followed, if desired, by a post-heat interval timed by the post heat unit. Ignitrons I-1 through I-6 may then be rendered conductive late in the periods of the supply so that current of a reduced magnitude flows during the post-heat interval. After this, the weld interval of the sequence timer times out and during the hold interval, the last two of the ignitrons to conduct (I-3 and I-5) may be permitted to become non-conductive to terminate the flow of welding current. The sequence timer then passes through the remainder of its sequence. The character of the secondary current, which is derived from the apparatus disclosed during the weld interval, is shown in the lower graph of Fig. 3 of the Stadum application.

The operation of our apparatus is illustrated in Fig. 2. In graph $a$ of Fig. 2, voltage is plotted vertically and time horizontally. The overlapping sine waves represent the voltages supplied between the supply conductors L2, L3 and L1 and an artificial neutral. The curves are labeled to indicate their corresponding supply conductors. The portions of the curve above the axis correspond to positive potential on the conductors L1, L2, L3, and the portions of the curve below the axis correspond to negative potential on these conductors. In the lower graph $b$, the voltage impressed on the condenser CF is plotted vertically and time horizontally. Points on the lower graph just vertically below corresponding points on the upper graph represent the same instant of time.

The power switch is closed at an instant indicated by an arrow in graph $b$ of Fig. 2. As shown, the capacitor CF is charged during the time that supply conductor L3 is negative relative to supply conductor L2. Since the resistance in the charging circuit is relatively low, the capacitor CF reaches full charge potential in a relatively short time interval of the order of a quarter of a cycle. The charge now remains on the capacitor so long as the apparatus is in stand-by condition. Once the start switch of the apparatus is actuated and the squeeze interval is terminated, firing potential is supplied to firing thyratrons FT1 and FT5, and the capacitor is discharged at a high rate as shown by the portion of the curve of graph $b$ in Fig. 2, which slopes downward. At this time, ignitrons I-1 and I-5 are fired simultaneously, as indicated. Thereafter, ignitrons I-6, I-2, I-3 and I-5 are fired in succession. While the latter ignitrons are conductive, supply conductor L3 again becomes negative with respect to supply conductor L2, and the capacitor CF is again fired. Thereafter, potential is supplied to render firing thyratron FT1 conductive, and capacitor CF again discharges as indicated by the falling portion of the curve. Ignitrons I-6, I-2, I-4, I-3 and I-5 again conduct in succession, and while they are conducting, capacitor CF is again charged. Subsequently, thyratron FT1 is again supplied with potential to render it conductive at a time determined by the setting of the post-heat unit. Capacitor CF is then again discharged as indicated by the dropping portion of the curve, and the above-described process is repeated.

Parameters—Fig. 1

We have found that in a system, such as is shown in the Stadum application, satisfactory positive operation is obtained at 230 volts power supply with a capacitor CF of 4 microfarads, a resistor RF of 1,000 ohms, and a suitable rectifier of the selenium type. In this circuit, the transformer TS steps up the 230 volts available at buses L2 and L1 to 550 volts. Because there is no bleeder resistance across capacitor CF, this capacitor is charged to the peak potential of $(550) \sqrt{2}$ or 780 volts, supplied by the 550 volt RMS secondary SS of transformer TS. This voltage is adequate to fire the ignitrons I-1 and I-5 positively and to produce a positively operating system, even at 230 volts power supply.

Description—Fig. 3

The apparatus shown in Fig. 3 differs from the apparatus shown in Figs. 1A and 1B only in the fact that the firing capacitor CF is connected at its terminal remote from the anode 59 of firing thyratron FT1 to the conductor AL3 so that it supplies firing potential only to the latter and not also to thyratron FT5.

Operation—Fig. 3

In operation at the beginning of a weld interval pulses for rendering thyratrons FT1 and FT5 conductive are supplied initially. Thyratron FT1 becomes conductive first by the discharge of capacitor CF and it fires ignitron I-1. Now firing thyratron FT5 is connected in a circuit extending from conductor L3, through ignitron I-1, conductor AL3, primary P, conductor AL4, contact 67, the anode 59 and cathode 43 of thyratron FT5, the igniter 45 and cathode 41 of ignitron I-5 to bus L2. Since the drop across ignitron I-1 in this circuit is small, there is adequate current to fire ignitron I-5. Thus, ignitrons I-1 and I-5 are rendered conductive positively at the beginning of the interval. Thereafter ignitrons I-6, I-2, I-4, I-3, I-5 and so on are rendered conductive as described in connection with Figs. 1A and 1B.

Conclusion

The apparatus is disclosed in Figs. 1 and 3 as including ignitrons and thyratrons. Discharge devices of the solid conduction type, particularly of silicon and germanium have recently been developed. To the extent that such devices or other devices may be used in place of the ignitrons or thyratrons to practice our invention, apparatus including such devices is within the scope of our invention. Accordingly, the words ignitron, valve or thyratron used in the following claims are intended to include within their scope such devices and similar devices either of the gaseous or solid conduction type.

Thus, while we have shown and described certain specific embodiments of our invention, we are fully aware that many modifications thereof are possible. Our invention therefore is not to be restricted except insofar as is necessitated by the spirit of the prior art.

We claim as our invention:

1. In combination, a first supply conductor; a second supply conductor; a first load conductor; a second load conductor; a first ignitron having an anode, a cathode and an igniter; means for connecting said anode to said first supply conductor; means for connecting said cathode to said first load conductor; a second ignitron having an anode, a cathode, and an igniter; means for connecting said anode of said second ignitron to said second load conductor; means for connecting said cathode of said second ignitron to said second supply conductor; a first firing valve for said first ignitron having an anode and a cathode; a second firing valve for said second ignitron having an anode and a cathode; a firing capacitor; asymmetrically conductive means for charging said capacitor; means for connecting in series said capacitor, said anode and cathode of said first valve, said igniter and cathode of said first ignitron, said first load conductor, said second load conductor, said anode and cathode of said second valve, said igniter and cathode of said second ignitron and said second supply conductor.

2. A converter system for converting power to be derived from the buses of a polyphase source into single phase power to be supplied to a load having in effect a first terminal and a second terminal, which converter system includes a first plurality of ignitrons each having an anode and a cathode, means for connecting said cathodes to said first terminal, means for connecting said anodes each to one of said buses, a second plurality of ignitrons each having an anode and a cathode, means for connecting said anodes to said second terminal, means for connecting said cathodes each to one of said buses, a firing circuit for each of said ignitrons, and means for actuating said firing circuit to fire said ignitrons in a predetermined sequence, an ignitron of said first plurality and an ignitron of said second plurality being fired simultaneously initially, said converter being characterized by the fact that the firing circuit for at least one of said last named ignitrons is of the independent type.

3. In combination, a first supply conductor; a second supply conductor; a first load conductor; a second load conductor; a first ignitron having an anode, a cathode and an igniter; means for connecting said anode to said first supply conductor; means for connecting said cathode to said first load conductor; a second ignitron having an anode, a cathode, and an igniter; means for connecting said anode of said second ignitron to said second load conductor; means for connecting said cathode of said second ignitron to said second supply conductor, a first firing valve for said first ignitron having an anode and a cathode; a second firing valve for said second ignitron having an anode and a cathode; a firing capacitor; asymmetrically conductive means for charging said capacitor; means for connecting in series said capacitor, said anode and cathode of said first valve, said igniter and cathode of said first ignitron, said first load conductor, said second load conductor, said anode and cathode of said second valve, said igniter and cathode of said second ignitron and said second supply conductor, and means for rendering said valves conductive simultaneously.

4. In combination, a first load conductor; a second load conductor; a first valve having an anode and a cathode; a second valve having an anode and a cathode; a capacitor; asymmetrically conductive means for charging said capacitor; and means for connecting in series said first load conductor, said second load conductor, said capacitor, said anode and cathode of said first valve and said anode and cathode of said second valve.

5. In combination, a first load conductor; a second load conductor; a first valve having an anode and a cathode; a second valve having an anode and a cathode; a capacitor; asymmetrically conductive means for charging said capacitor; means for connecting in series said first load conductor, said second load conductor, said capacitor, said anode and cathode of said first valve and said anode and cathode of said second valve, and means for rendering said valves conductive simultaneously.

6. A converter system for converting power to be derived from the buses of a polyphase source into single phase power to be supplied to a load having in effect a first terminal and a second terminal, which converter system includes a first plurality of ignitrons each having an anode and a cathode, means for connecting said cathodes to said first terminal, means for connecting said anodes each to one of said buses, a second plurality of ignitrons each having an anode and a cathode, means for connecting said anodes to said second terminal, means for connecting said cathodes each to one of said buses, a firing circuit for each of said ignitrons, and means for actuating said firing circuit to fire said ignitrons in a predetermined sequence, an ignitron of said first plurality and an ignitron of said second plurality being fired simultaneously initially, said converter being characterized by means common to said last named ignitrons for supplying a potential of a magnitude substantially greater than the magnitude of the potential of said source for firing said last named ignitrons.

7. A converter system according to claim 6 characterized by the fact that the common means includes a capacitor and asymmetrically conductive means including a voltage step-up transformer for charging said capacitor.

References Cited in the file of this patent

UNITED STATES PATENTS

| | | |
|---|---|---|
| 2,474,866 | Sciaky | July 5, 1949 |
| 2,549,831 | Longini | Apr. 24, 1951 |